United States Patent [19]
Buerkel et al.

[11] Patent Number: 5,125,964
[45] Date of Patent: Jun. 30, 1992

[54] FLUIDIZED BED PROCESS FOR PREPARING TUNGSTEN POWDER

[75] Inventors: William A. Buerkel, Lyndhurst; Scott R. Wightman, Hudson; Dandridge S. Tomalin, Chagrin Falls, all of Ohio

[73] Assignee: General Electric Company, Schenectady, N.Y.

[21] Appl. No.: 579,508

[22] Filed: Sep. 10, 1990

[51] Int. Cl.$^5$ .................. C22B 5/14; C22B 34/36
[52] U.S. Cl. .......................... 75/366; 75/623
[58] Field of Search .................. 75/623, 366

[56] References Cited

U.S. PATENT DOCUMENTS

| | | | |
|---|---|---|---|
| 2,993,755 | 7/1961 | Redanz | 423/606 |
| 3,234,007 | 2/1966 | Blocher, Jr. et al. | 75/255 |
| 3,236,634 | 2/1966 | Lambdin, Jr. et al. | 75/365 |
| 4,402,737 | 9/1983 | Kronenwetter | 75/351 |

FOREIGN PATENT DOCUMENTS 547039 10/1956 Canada .................. 75/623

*Primary Examiner*—Melvyn J. Andrews
*Attorney, Agent, or Firm*—Edward M. Corcoran; Stanley C. Corwin; Fred Jacob

[57] ABSTRACT

Tungsten metal powder of controlled particle sizes is obtained in a fluid bed process by reducing particles of tungsten oxide having the formula $WO_X$ where x is from 2.5 to 3.0. The $WO_X$ powder particles are heated to and then maintained at a temperature between 650° and 1000° C. in a reducing atmosphere, which is maintained by passing a mixture of hydrogen gas, water and optionally nitrogen gas through a fluid bed of the tungsten oxide particles until substantially all of the powder solid is tungsten dioxide, $WO_2$. The ratio of water partial pressure to hydrogen partial pressure in the feed gas is equal to or slightly higher than the equilibrium partial pressure ratio. The flow of water vapor is then discontinued, either gradually or instantaneously, while maintianing the flow of hydrogen gas to reduce the $WO_2$ to tungsten metal. By maintaining the ratio of water partial pressure to hydrogen partial pressure above the equilibrium value until the original $WO_X$ is substantially reduced to $WO_2$, a product having a narrow particle size distribution is obtained. The $WO_X$ may be obtained by decomposition of ammonium paratungstate in the same reactor.

5 Claims, 2 Drawing Sheets

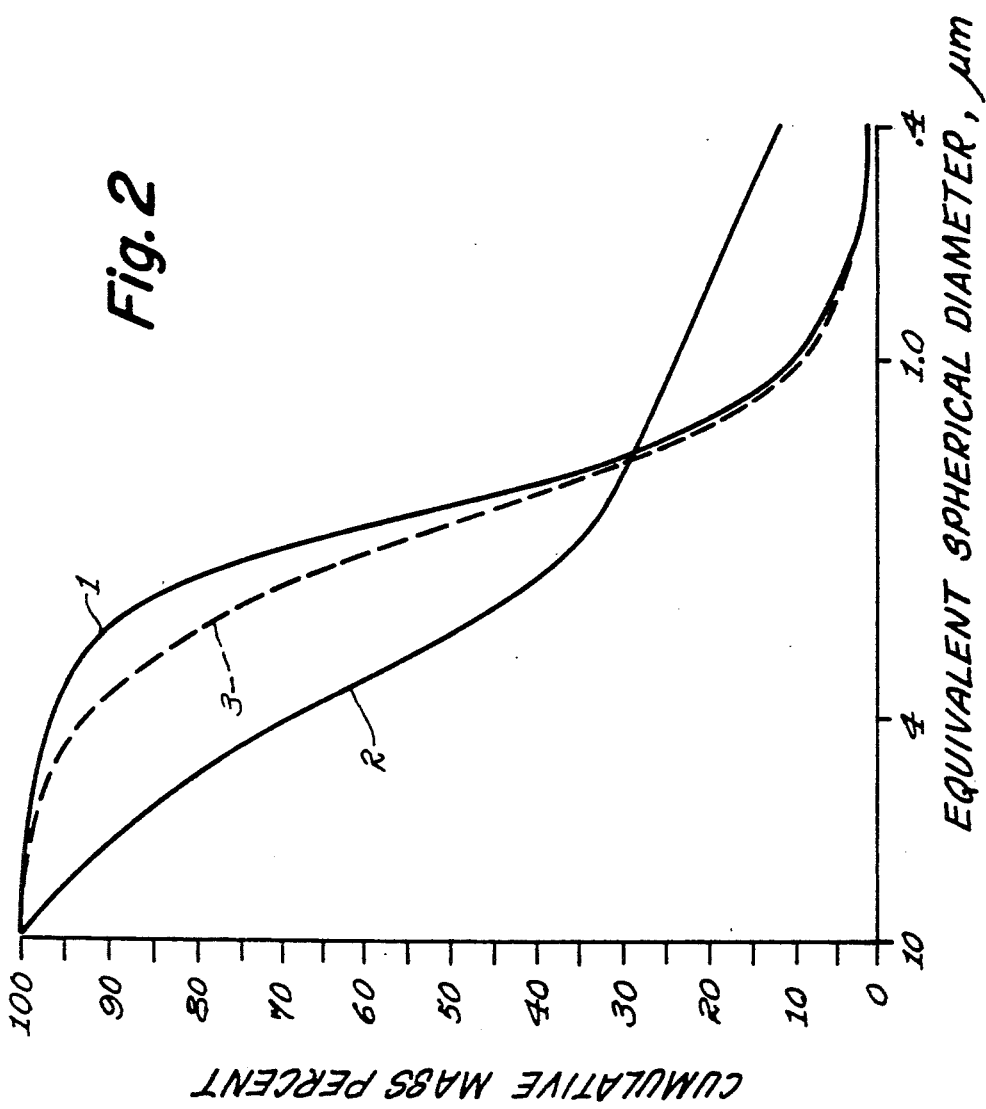

FLUIDIZED BED PROCESS FOR PREPARING TUNGSTEN POWDER

BACKGROUND OF THE INVENTION

1. Field of the Invention

This invention relates to a process for the preparation of powdered tungsten metal, and more particularly to a fluidized bed process for producing tungsten metal of controlled particle size from particles of tungsten oxide.

2. Background of the Disclosure

Tungsten and its alloys are widely used in high temperature structural elements, including lamp filaments, other electrical elements, and electrical instruments. Tungsten is also used as an alloying element with other metals in the manufacture of structural parts in which strength, ability to withstand high temperatures, and oxidation and corrosion resistance, particularly at high temperatures, are required. Tungsten is also a starting material for the manufacture of tungsten carbide, which is very hard and is used in tools, such as machining, cutting and well drilling tools and other applications where hardness is required.

Tungsten metal powder is the starting material of choice for all the above products. The tungsten metal powder should be highly pure and preferably of substantially uniform particle size. High purity is readily obtained by present methods, but uniformity of particle size is not always achieved. Wide particle size distribution complicates fabrication into many goods and products. Most tungsten metal powder is produced commercially in a two step process in which (1) ammonium paratungstate (APT) is converted to a tungsten oxide in particle form in a rotary tube furnace, and in which (2) the oxide particles, contained in rectangular boats, are reduced to tungsten metal powder in a stationary tube furnace. The tungsten oxide particles obtained in the first step are chemically non-uniform and are of varying particle size, even with carefully controlled furnace conditions. Tungsten metal powder obtained in the second step is likewise not uniform in particle size. This is due to variations in the starting oxide, in temperature and relative hydrogen/water contents within the particle bed. It is not possible to obtain a uniform product with narrow particle size distribution according to this method. A uniform product with broad particle size distribution is achieved only by blending various lots of powder, since particle size distribution of the tungsten metal powder as produced varies from lot to lot.

Another commercial process for preparing tungsten uses a rotary process for converting APT to tungsten metal in a single step. This process requires continuous and accurate control of APT feed rate. Product quality is also dependent upon APT feed rates. Throughput is related to the desired particle size. Throughput of a typical rotary furnace can vary from 20 kilograms per hour for fine particles to 70-80 kilograms per hour for coarse particles. In practice, the single step rotary reduction requires approximately the same degree of process control as the first process and is slightly less costly. On the other hand, particle size distribution is generally even broader than that in the first mentioned process.

Other processes have been reported in the literature but have not gained wide acceptance. For example, U.S. Pat. No. 3,324,007 describes a fluidized bed process for obtaining tungsten metal powder from tungsten hexafluoride.

Early attempts to prepare tungsten metal powder by fluid bed techniques resulted in very broad (and hence less desirable) particle size distribution than those obtained in stationary and rotary furnaces.

SUMMARY OF THE INVENTION

The present invention relates to a fluidized bed process for producing tungsten metal from particles of tungsten oxide wherein said tungsten oxide is reduced in a fluidized bed reaction zone in the presence of a mixture of hydrogen and water and wherein water is added to said reaction zone in an amount sufficient to maintain sufficient water in said zone to achieve the desired level of reduction of said tungsten oxide particles to tungsten metal. More particularly, this invention relates to a fluidized bed process for producing tungsten metal powder having improved particle size distribution which comprises the steps of:

(a) contacting particles of $WO_X$, wherein x is at least 2.5, with hydrogen and water vapor under fluid bed conditions at a temperature in the range of about 650° to about 1000° C. and at a water partial pressure equal to or greater than the equilibrium partial pressure for the reaction

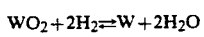

$$WO_2 + 2H_2 \rightleftharpoons W + 2H_2O$$

whereby said particles of $WO_X$ are reduced essentially to particles of $WO_2$ with substantially no formation of tungsten metal, and (b) reducing the partial pressure of water in the fluid bed to a level sufficient to achieve reduction of said particles of $WO_2$ to tungsten metal while continuing to maintain said bed at a temperature which is substantially equal to or higher than said first temperature but not over about 1000° C.

The particles of tungsten oxide $WO_X$ are produced by heating particles of ammonium paratungstate.

BRIEF DESCRIPTION OF THE DRAWINGS

In the drawings:

FIG. 2 is a graph showing tungsten particle size distributions for stationary reduction and fluid be reduction with and without water control.

DETAILED DESCRIPTION

Figure 1:
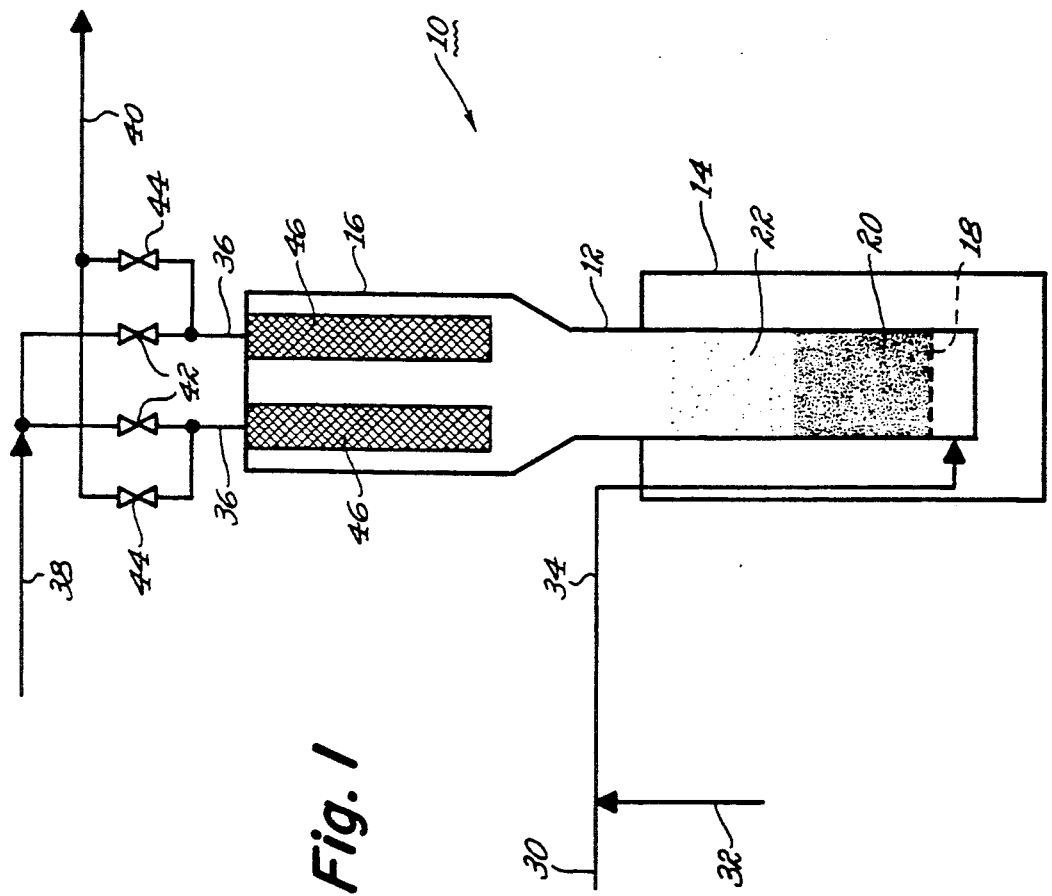
FIG. 1 is a schematic illustration of a system for batch conversion of tungsten oxide particles to tungsten metal powder.

As set forth above, the present invention relates to a process for producing tungsten metal particles of controlled particle size by fluidized bed reduction of tungsten oxide $WO_X$ wherein x is at least 2.5 and preferably from 2.5 to 3, and wherein water is added so that the water content in the bed is equal to or greater than the equilibrium water content during the first portion of the reduction.

The starting material, tungsten oxide $WO_X$ wherein x is from 2.5 to 3, may be prepared from ammonium paratungstate (APT) in the same reactor as that used for subsequent reduction from tungsten oxide to tungsten metal powder. This process will be described with particular reference to FIG. 1 of the drawings.

Ammonium paratungstate (APT) powder is charged to an upright reactor 10, which has an upright cylindrical reaction section 12 surrounded by a heating jacket 14, and an upright cylindrical freeboard section 16, which is above the main reaction section 12 and is of slightly larger diameter. Reactor 12 also has a perforated gas distributor plate 18 near the lower end of the reaction section 12. APT is charged to the reactor above plate 18. This results in a bed 20 of APT which is supported on plate 18. As will be described below, this bed is a fluidized bed once the flow of gas at a velocity above the fluidizing velocity is commenced. Above the fluid bed 20 in reaction section 12 is a zone 22 in which the solid particle density is much lower than it is in the fluid bed 20.

An inert fluidizing gas, preferably nitrogen, is fed to reactor 10 beneath gas distributor plate 18 via fluidizing gas inlet conduit 30 at a velocity sufficient to cause fluidization. The temperature of the nitrogen gas is sufficient to cause decomposition of APT, and is from about 600° C. to about 900° C., preferably about 750° C. Once the particles reach that temperature, that temperature is maintained for a time sufficient to cause the composition of the APT to change to tungsten oxide $WO_X$, wherein x is from 2.5 to 3.0, denoting that the average oxidation state of the tungsten is from 2.5 to 3.0.

When decomposition of APT to $WO_X$ is substantially complete, nitrogen flow may be terminated and flow of a mixture of hydrogen gas and water vapor (and optionally nitrogen) is commenced. The hydrogen gas (mixed with nitrogen if desired) is introduced via fluidizing gas inlet conduit 30 and flow at a velocity sufficient to fluidize the $WO_X$ particles in bed 20. Water is supplied through water inlet conduit 32. The hydrogen gas and water are premixed and flow through mixture conduit 34 to reactor 10. Changeover from nitrogen to either hydrogen or a hydrogen-nitrogen mixture may be either abrupt or gradual as desired.

The temperature maintained in fluid bed 20 during the first phase of reduction, herein called the first temperature or T1, is sufficient to cause reduction of the starting tungsten oxide or oxide mixture $WO_X$ to tungsten dioxide $WO_2$. This first temperature is in the range of about 650° C. to about 1000° C.

The mean particle diameter, which may be measured by the equivalent spherical diameter in micrometers ($\mu$m), varies significantly with the fluid bed temperature during this first phase. Higher reaction temperatures lead to larger mean particle diameters. This is shown in TABLE I below.

TABLE I

| Cumulative Mass % | Equivalent Spherical Diameter, $\mu$m | | |
|---|---|---|---|
| | 800° C. | 850° C. | 900° C. |
| 0 | 0.5 | 0.5 | 0.5 |
| 10 | 1.1 | 1.6 | 2.4 |
| 25 | 1.4 | 2.2 | 4.0 |
| 50 | 1.8 | 3.0 | 5.8 |
| 75 | 2.3 | 4.5 | 7.5 |
| 90 | 3.3 | 6.5 | 10.2 |
| 100 | 10 | 14 | 17 |

TABLE I shows a "cumulative mass %" of tungsten particles vs. reduction temperature at various temperatures from 800° C. to 900° C. (The term, cumulative mass percent denotes the mass or weight percentage of particles having equivalence spherical diameters equal to or less than the indicated particle diameter at the indicated reduction temperature. All runs in TABLE I were carried out with added water in accordance with this invention.)

Particular attention is directed to the equivalent mean particle diameter, which is denoted by a cumulative mass percentage of 50 in the above TABLE I.

It is important to control reduction so that substantially all of the starting tungsten oxides, $WO_X$, is reduced to tungsten dioxide, $WO_2$, before further reduction takes place. To achieve this, the amount of water (as water vapor) added by water inlet conduit 32 during the first phase of reaction must be such as to give an actual water partial pressure equal to or greater than (usually only slightly greater than) the equilibrium water partial pressure, which is given by equation (1) below:

$$K_p = P_{H_2O}/P_{H_2} \quad (1)$$

The above equilibrium constant Kp is the equilibrium constant for the reduction of tungsten oxide, $WO_2$, to tungsten metal according to the equation:

$$WO_2 + 2H_2 \rightleftharpoons W + 2H_2O$$

The equilibrium constant Kp increases with increasing temperature, as shown by equation (2) below where T is in degrees Kelvin (K):

$$1/T \times 10^4 + 1.6 \log K_p + 7.3 \quad (2)$$

Over the temperature range of interest (about 650° to about 1000° C.) the equilibrium partial pressure of water ranges from less than 0.01 × the hydrogen partial pressure at 650° C. to about 0.12 × the hydrogen partial pressure at 1000° C. The actual partial pressure of water vapor in the tungsten oxide fluid bed 20 must be equal to or above that equilibrium value, in order to favor the control led reduction of $WO_X$ to $WO_2$. If the actual partial pressure of water vapor is allowed to drop below the equilibrium value, the reduction of $WO_X$ directly to tungsten metal is favored and this results in overly broad particle size distribution.

The temperature in the tungsten oxide fluid bed 20 should be maintained at this first temperature T1 until equilibrium is reached. Attainment of equilibrium can be determined by analyzing either continuously or periodically at predetermined intervals the off gases and vapors from reactor 10. When the percentage of water vapor in the effluent is the same as in the feed gas, equilibrium has been reached, and has substantially all of the tungsten oxide charge in the reactor is present as $WO_2$.

Effluent gases are withdrawn from the top of the reactor 10 by gas outlet conduit 36. This outlet conduit 36 has two branch conduits 38 and 40, for blow back gas and off gas respective. The effluent in off gas conduit 40 may be analyzed either continuously or periodically for water vapor content in order to monitor the progress of the reaction. Branch conduits 38 and 40 may have valves 42 and 44, respectively, close to the point of divergence from outlet conduit 36.

One may monitor temperature and pressure at selected locations in the system as desired, and suitable means (not shown) may be provided for this purpose.

Once the first phase of the reaction has reached equilibrium, the second phase, i.e., reduction of tungsten dioxide, $WO_2$, to tungsten metal powder, W, may be commenced. During the second phase, the flow of added water vapor is either cut back gradually or cut off abruptly so that the partial pressure of water vapor in the feed is below the equilibrium value Kp, resulting in reduction of tungsten dioxide $WO_2$ to tungsten metal. Hydrogen flow is continued throughout this second phase. Gas velocity is sufficient to maintain fluid bed conditions. The temperature T2 during this second phase may be lower than, substantially equal to, or higher than the aforesaid temperature T1 during the first phase, and is in the range of about 650° C. to 1000° C. Preferably T2 is substantially equal to T1. Progress of the second phase can be monitored by continuously or periodically measuring the dew point of the effluent gas. A dew point not higher than about −10° C., which indicates the substantial absence of water vapor in the effluent, indicates that reduction from $WO_2$ to tungsten metal is essentially complete.

When reduction is nearly complete, e.g., at least about 95% complete (this figure is approximate and is not critical), the temperature in fluid bed 20 may be increased slightly, e.g., by about 50° C. but not to exceed a maximum temperature of 1000° C., in order to hasten completion of the reaction. At this point, the desired narrowed particle size distribution has been achieved and a slight increase in temperature above T2 will not adversely effect this distribution.

The gas velocity in reactor 10 must be maintained at a velocity equal to or above fluidizing velocity throughout both phases of the reduction. Gas velocities from about 150 to about 225 feet per minute (or higher) have been found suitable.

Passage of fines into the reactor effluent is prevented by use of a fine porous metal filter 46, preferably cylindrical in shape as shown, in the upper portion of the reactor 10. To prevent these filters from becoming clogged, blow back gas introduced by blow back gas conduit 38 may be introduced in to the reactor 10 at periodic intervals to clean the filters. A time pulsed gas flow arrangement may be used for this purpose.

This invention may be described further with reference to the examples which follow:

EXAMPLE

The examples here in were carried at in a reaction system substantially as shown in FIG. 1. Heat was supplied to the reactor by means of a fluid bed furnace, which was an electrically heated eating jacket containing a fluid bed of high purity power alumina. Heat was transferred through the reactor walls from the fluid bed of alumina to the fluid bed of tungsten oxide in the reactor. Thermocouples located 1, 3 and 6 inches above gas distributor plate 18 were used to monitor the temperature within reactor 10. The signal from one of these thermocouples was used to control reactor temperatures. All runs described in the following examples were conducted in the batch mode. That is, powdered solid APT precursor was charged to the reactor and decomposed to $WO_X$ prior to the start of each run, and cooled tungsten metal powder was removed from the reactor as product at the end of each run. On the other hand, fluidizing gas was fed and off gas removed continuously throughout the course of reaction. Water vapor was fed as described in the examples below.

EXAMPLE 1

Tungsten oxide, $WO_X$, prepared by decomposition of ammonium paratungstate with nitrogen at elevated temperature, was used as the starting material. A mixture of hydrogen and water vapor was passed upwardly through the reactor 10 at a gas velocity of 225 feet per minute while externally heating the reactor. The partial pressure ratio $PH_2O/PH_2$ (the ratio of water partial pressure to hydrogen partial pressure) in the wet hydrogen feed gas was 0.064. The fluid bed and the freeboard space in the reactor were heated from the initial temperature (about 650° C.) to the target reduction temperature of 800° C. while maintaining this partial pressure ratio in the feed. The aforesaid partial pressure ratio of water to hydrogen was maintained for a time after a temperature of 800° C. was attained. Then flow of water vapor was discontinued and dry hydrogen flow was continued while still maintaining a reactor temperature in both fluid bed and freeboard space of 800° C. The total time for hydrogen gas flow was 340 minutes. At the end of this time, the reactor and its contents were cooled down to ambient temperature by means of flowing nitrogen. The cooled tungsten metal was recovered. Tungsten metal produced in this example had a mean particle size Dp of 1.8 microns (Dp represents a size such that 50% of the total particle mass or weight is composed of particles of smaller diameter and the other 50% of mass or weight is composed of particles larger diameter). In addition, a very narrow particle size distribution was achieved, as shown in curve 1 in FIG. 2. As this curve shows, the equivalent particle diameter at a accumulative mass percentage of 90 was about 3.8 microns, and the equivalent particle diameter at accumulative mass percentage of 10% was 1.0 microns.

COMPARATIVE EXAMPLE 2

Dry hydrogen was flowed through a bed of tungsten oxide, $WO_X$, at a gas velocity of 225 feet per minute for a total time of 80 minutes. The reactor was heated during this time from its initial temperature (about 650° C.) to a target reduction temperature about 1000° C. and was obtained at this target reduction temperature throughout most of the reduction. Tungsten metal powder having a mean particle diameter Dp of 2.7 microns was obtained. In contrast to the product of example 1, the product of this comparative example 2 had a very broad particle size distribution. The equivalent spherical diameter corresponding to accumulative mass percentage of 10% is less than 0.4 microns. Accumulative mass percentage of 90% corresponds to a equivalent spherical diameter of about 6.8 microns. The particle size distribution of tungsten particles obtained in this comparative example 2 is shown as curve 2 in FIG. 2.

COMPARATIVE EXAMPLE 3

For further comparison, the particle size distribution of tungsten metal powder obtained in a conventional stationary tube furnace was determined. This particle size distribution is shown as curve 3 in FIG. 2. The mean particle diameter Dp is about 2.0 microns. It will be observed that the particles size distribution of this stationary furnace product is slightly broader than that of the product of example 1, and much narrower than that of comparative example 2.

EXAMPLE 4

The starting material in this example was tungsten oxide, $WO_X$, obtained by the decomposition of APT with nitrogen at a temperature of about 650° C. in reactor 10. Fluidizing gas was passed upwardly through the bed of $WO_X$ particles in the reactor at a gas velocity of 150 feet per minute. The fluidizing gas was initially nitrogen, and the gas feed was changed stepwise from pure nitrogen to a mixture of 50% by volume of nitrogen and 50% combined volume of hydrogen and water vapor. Meanwhile the temperature in the reactor (both fluid bed and freeboard space) was increased from the initial temperature (about 650° C.) to the desired target reduction temperature of 850° C. Water in the feed was not measured precisely in this example as it was in example 1, but was sufficient to maintain a water partial pressure in excess of the equilibrium water partial pressure, at least until the target reduction temperature of 850° C. was attained. After this target reduction temperature was achieved, nitrogen and water vapor were discontinued and the feed gas consisted of 100% dry hydrogen. The total time for hydrogen gas flow was 90 minutes. At the end of this time, the product tungsten metal particles were cooled to ambient temperature in flowing nitrogen. Product tungsten metal powder in this example had a mean particle diameter of 3.0 microns. In addition, minimal fines are obtained. Particle size distribution was even appreciably narrower than it was in the case when no feed water vapor was used (comparative example 2, for example) even though it was an overall coarser powder and it had a more peaked distribution than conventional reduced powder.

The process of this invention offers a number of advantages over both conventional processes and fluid bed processes which do not employ added water vapor in the feed gas sufficient to maintain a water partial pressure above the equilibrium partial pressure. As compared to the rotary tube furnace product, greater process control, better mixing of gases in the bed of powder being reduced, and greater uniformity of particle size (i.e., narrower particle size distribution) are achieved. As to compared to fluid bed processes which do not employ added water, much greater uniformity of particle size is achieved.

While this invention has been described with reference to specific embodiment thereof, it should be understood that such description is by way of illustration and not by way of limitation.

What is claimed is:

1. A fluidized bed process for producing tungsten metal powder having improved particle size distribution which comprises the steps of:
   (a) contacting particles of $WO_X$, wherein X is at least 2.5, with flowing gas comprising hydrogen and water vapor under fluid bed conditions at a temperature in the range of about 650° to about 1000° C. and at a water partial pressure equal to or greater than the equilibrium partial pressure for the reaction $$WO_2 + 2H_2 \rightleftharpoons W + 2H_2O$$

whereby said particles of $WO_X$ are reduced essentially to particles of $WO_2$ with substantially no formation of tungsten metal powder, and
   (b) reducing the partial pressure of said water in said fluid bed to a level sufficient to achieve reduction of said particles of $WO_2$ to tungsten metal while continuing to maintain said fluidized bed in the presence of flowing hydrogen at a temperature which is substantially equal to or higher than said first temperature but not over about 1000° C. for a time sufficient to reduce said $WO_2$ to said tungsten metal.

2. A process according to claim 1 wherein said first temperature is from about 800° C. to about 1000° C.

3. A process according to claim 1 wherein the gas velocity in said bed is at least about 150 feet per minute.

4. A process according to claim 1 wherein said second temperature is higher than said first temperature.

5. A process according to claim 1 wherein said step (b) is carried out with essentially no water vapor added to said fluidized bed during said reduction.

* * * * *